Feb. 15, 1966 J. B. C. DU MONT 3,234,969
MULTIBORE CORRUGATED FLEXIBLE HOSE
Filed May 1, 1964 2 Sheets-Sheet 2
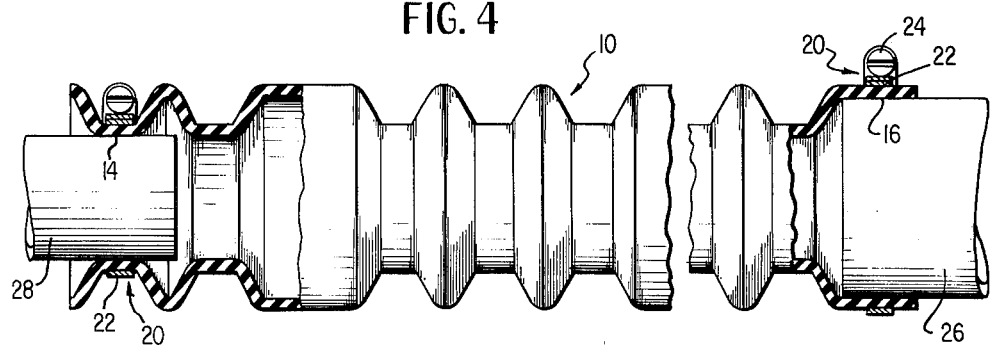
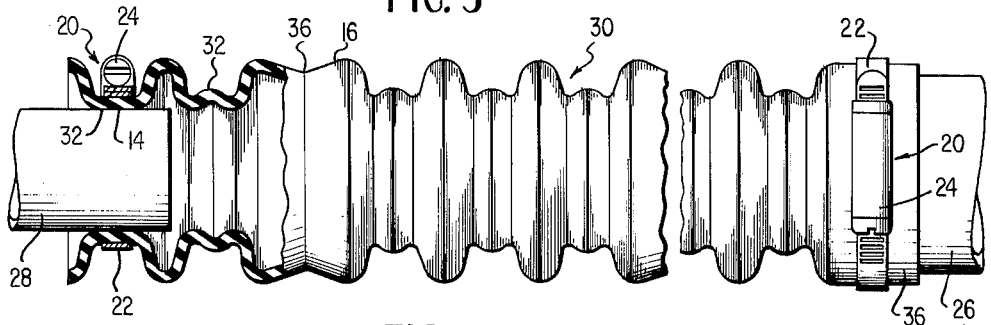
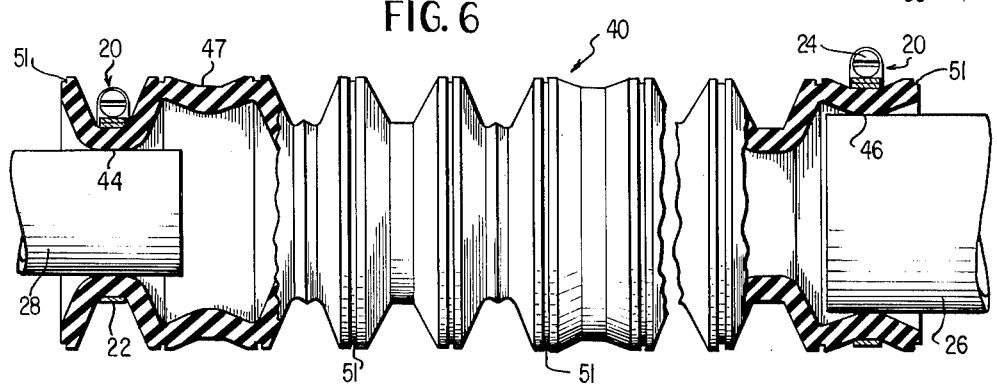
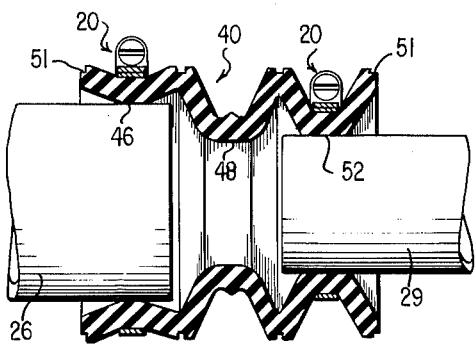
INVENTOR.
Jerome Bernard Clifford duMont
BY
ATTORNEYS.

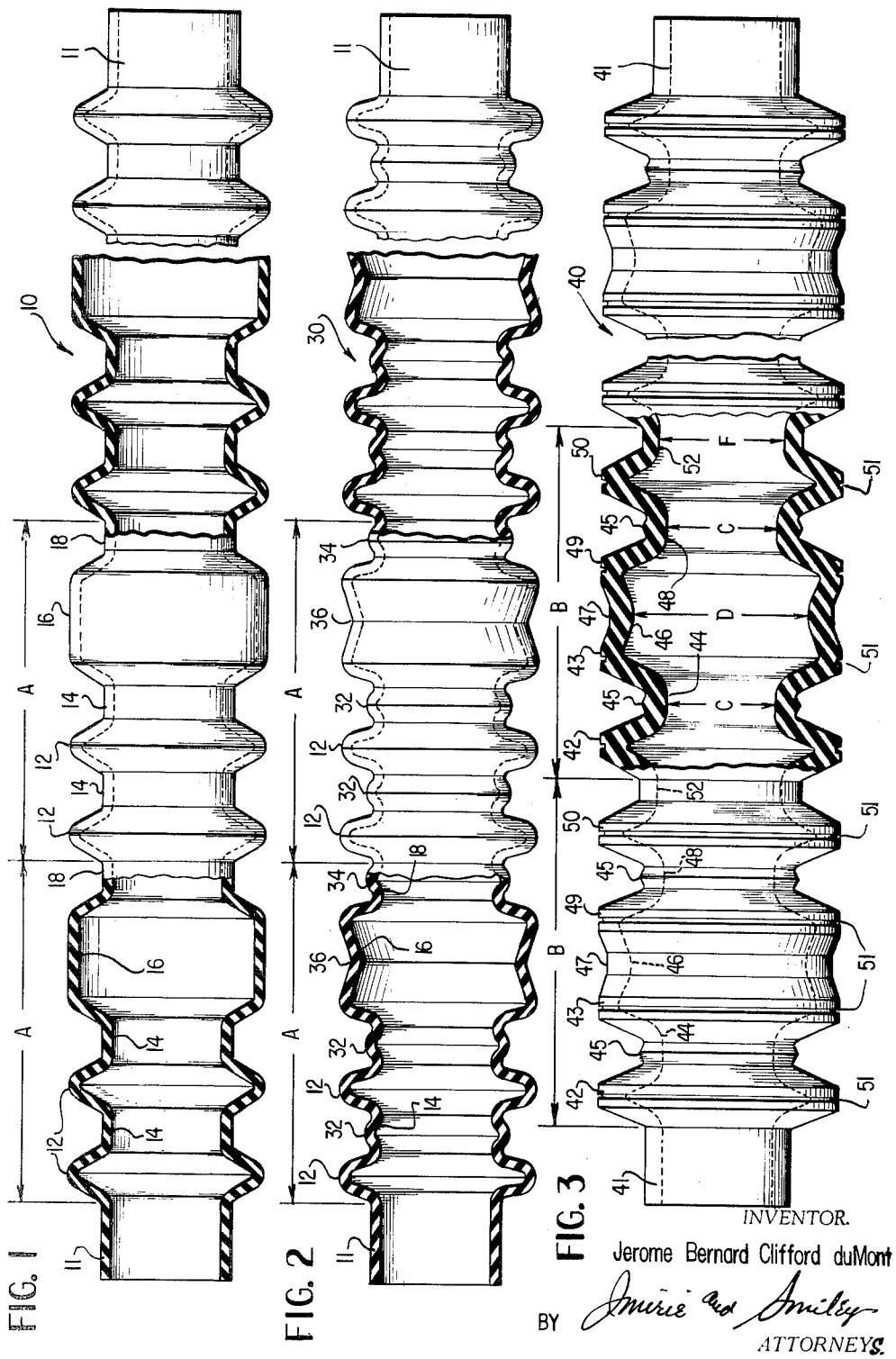

United States Patent Office 3,234,969
Patented Feb. 15, 1966

3,234,969
MULTIBORE CORRUGATED FLEXIBLE HOSE
Jerome Bernard Clifford du Mont, 23 Warren Fields,
Stanmore, Middlesex, England
Filed May 1, 1964, Ser. No. 364,246
Claims priority, application Great Britain, Feb. 24, 1961,
6,960/61
8 Claims. (Cl. 138—121)

This invention relates to improvements in corrugated flexible hose and is a continuation-in-part of application Serial Number 175,118, filed February 23, 1962, now abandoned.

The invention relates to a hose of the type, for example, used to connect the radiator of an automobile to its engine block, and which is formed of rubber, or other elastomeric material, capable of being compressed about the nipples, or pipes, to which the hose is connected for tightly sealing the coupling portions against fluid escape.

A primary object of the invention is to provide a hose of the above type, which is corrugated, to retain flexibility while improving the strength and rigidity, and which has the base or apex of at least some of its corrugations axially elongated, whereby the hose may be cut at appropriate locations along its length to expose coupling bores of different diameter corresponding to the internal diameters of said elongated bases and apices so that the hose may be clamped to pipes of different size.

Another object of the invention is to provide a corrugated hose, of the above described characteristics, in which the bases of selected corrugations are of different diameter so that at least three different sized coupling bores may be exposed by cutting the hose adjacent appropriate corrugation bases and apices.

Still another object of the present invention is to provide a corrugated hose, of the above described characteristics, having integrally molded stiffening ribs to maintain the bore of the hose in a reasonable open state when the hose is bent or curved along its axial length.

A further object of the invention is to provide an improved method of forming a corrugated hose with stiffening ribs, as above described, by blowing a cylinder of raw rubber, or the like, outwardly against a split mold shaped to conform to the desired outer surface of the hose and so angled and curved as to make use of the natural stretch of raw rubber during molding to provide thickened portions, or ribs, without thinning of the hose wall at adjacent, or other, portions.

Yet another object of the invention is to provide a corrugated hose, of the above described characteristics, in which certain of the corrugations are provided with reverse corugations of small radial depth to maintain the bore in reasonably open state, to increase the coupling flexibility, and to render the hose more elastic.

It will be apparent that a corrugated hose, according to the invention, will yield the outstanding advantage that a few standard hoses constructed in the manner stated will be capable of replacing many hoses of different lengths and coupling sizes, by cutting a standard hose to an appropriate shorter length to meet the replacement need and at the same time expose a coupling bore of the proper replacement size.

A further advantage of the hose according to the invention is that within a comparatively short length, the largest effective coupling bore provided is of the order of 40% to 100% larger than the smallest coupling bore so that connections to pipes of considerable difference in size may be effected.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is an elevation of a simple form of corrugated hose in accordance with the invention in which parts are broken away to reveal axial sections;

FIG. 2 is a view similar to FIG. 1 of a hose such as that shown in FIG. 1 but modified to provide reverse corrugations;

FIG. 3 is a view similar to FIG. 1 of a third and preferred form of corrugated hose in accordance with the invention in which the hose of FIG. 2 is further modified;

FIG. 4 is a view similar to FIG. 1 showing portions of the hose of FIG. 1 clampingly sealed to the ends of nipples, or connecting pipes;

FIGS. 5 and 6 are views similar to FIG. 4 showing the hoses of FIGS. 2 and 3, respectively, clamped to connecting pipes; and FIG. 7 is a fragmentary sectional view of a small portion of the hose of FIG. 3 clamped to pipes of different bore sizes.

Referring now more particularly to the drawings, the hose 10 illustrated in FIGS. 1 and 4 is a simple embodiment of the invention in which the hose is illustrated as being a length of corrugated hose having conventional, cylindrical coupling sections 11 at each end, usually of the same bore size, for connecting the hose to connecting pipes. The hose, of course, may be used for other purposes than that of an automobile radiator hose and may be of any desired length. However, in the described application, a suitable length would be approximately 4 feet, and the hose would be desirably formed of an elastomeric, or compressible, material such as rubber, although various plastics, neoprene and other materials may obviously be used so long as a conventional clamp, when applied to the outer surface of the hose, is capable of compressing the hose about a connecting pipe to form a fluid-tight seal. The hose 10, between the coupling end sections 11, is formed of a plurality of intermediate sections A which have identical, or similar, configurations, but which may be different if so desired. In FIG. 1, each intermediate section A is shown as comprising a pair of identical corrugations perpendicular to the hose axis having the apex 12 and the base 14 followed by a third corrugation also at right angle to the hose axis and having the apex 16 and the base 18. In a four foot length of hose, approximately 15 or 16 intermediate sections A would be included. The hose 10 is of substantially uniform wall thickness and the corrugation bases 14 and 18 are of the same internal diameter. To distinguish the hose of the invention over conventional structures, certain of the corrugation bases and apices are lengthened to form substantially cylindrical annuli suitable to perform the function of coupling bores. Thus it is apparent that all of the bases 14 and 18 are lengthened and flattened into cylinders as compared to the apices 12, and that the apices 16 are lengthened even more than the bases 14. Thus, if the hose is severed at right angle to its axis at selected locations along its length to expose a base 14 or 18, or an apex 16, as a coupling section, a conventional clamp such as 20 in FIG. 4 may be applied about the hose and the pipe over which the exposed corrugation base or apex is telescoped to provide a surface of sufficient axial length to adequately and properly seal the connection when the clamp 20 is tightened.

The clamp 20 may comprise a band of metal 22 which is circular in form with overlapping ends and which may be opened radially outwardly to admit a hose to be clamped. The band is then tightened about the hose and pipe by means of the worm screw 24. Such clamps are conventional and may be formed of metal bands as narrow as 1/8", greater widths up to and possibly larger than 1/2" being used for larger diameter hoses. In some instances, a pair of wires are substituted for the metal band and which may be clamped in similar manner, the wires being closely spaced axially of the hose to apply pressure at spaced annuli about the hose.

At the right of FIG. 4, an exposed corrugation apex 16 of the hose 10 of FIG. 1 has been telescoped over a connecting pipe 26 and clamp 20 has been applied outside the apex 16 and tightened to clamp the hose to the pipe, thus providing a suitable fluid-tight seal. At the left of FIG. 4, the hose has been cut to expose a base 14 of an intermediate corrugation which has been telescoped around a connecting pipe 28, of smaller size than pipe 26, and a similar clamp 20 is shown applied and tightened to adequately seal the coupling.

The hose 30 of FIG. 2 is substantially identical with hose 10 of FIG. 1 as above described, except that a small reverse corrugation 32 or 34 is formed in each base 14 or 18 and another reverse corrugation 36 is formed in each apex 16. The reverse corrugations, without affecting a reduction of coupling flexibility, render the hose stronger, more rigid and elastic and prevent collapse, maintaining its bore in a reasonably open state when the hose is bent longitudinally to describe an axial curve. The longitudinal elongation of bases 14 and 18 and apex 16 to a minimum length of about 3/4" not only provides space for clamping, but also permits addition of the reverse corrugation. The shallow radial depths of the corrugations, while departing somewhat from cylindrical surfaces, do not prevent application of clamps and the flexibility and compressibility of the hose material permits these reverse corrugations to be pressed into cylindrical sealing surfaces by the clamps.

As shown at the left of FIG. 5, the hose 30 of FIG. 2 has been cut at one of its corrugations to yield a coupling bore of small diameter enclosed by the corrugation base 14 and reverse apex 32. The application of a clamp 20 about these parts and pipe 28 with suitable clamping pressure is sufficient to flatten the reverse corrugation 32 so that a good seal is obtained along parts 32 and 14, a large proportion of whose combined axial length is in contact with the clamp 20. At the right of FIG. 5, a reverse corrugation 36 has similarly been exposed by cutting the hose and clamped to the larger pipe 26.

The hose 40, FIG. 3, is a preferred embodiment in which the hose 30 is further modified to provide strengthening ribs slightly increasing the hose wall thickness. Hose 40 is provided with coupling end sections 41 of cylindrical form at each end and of nominal wall thickness. Coupling sections 41 are connected by a series of, preferably, identical intermediate sections B. Each intermediate section has a corrugation comprising an apex 42 corresponding to apex 12 of hose 30 and a base 44 corresponding to base 14 of hose 30. The next corrugation has an apex 46 with reverse corrugation 47 corresponding to apex 16 and reverse corrugation 36 respectively of hose 30. The following corrugation's apex 49 and base 48 are substantially identical to parts 42 and 44. The last corrugation has apex 50 corresponding to apex 12 and base 52 corresponding to base 18 except that base 52 is of slightly larger internal diameter than bases 18 and 44 and smaller diameter than apex 46, so that a third coupling bore size is provided. Each of the bases 44 and 48 is provided with a narrow thickening rib 45 corresponding in position to the small reverse corrugations 32 in hose 30. The apices 42, 43, 49 and 50 are also thickened to provide narrow rib portions which strengthen the hose. The hose is preferably formed with shallow annular grooves 51 desirably spaced uniformly along the length of the hose and in planes normal to the hose axis to indicate where the hose should be cut to expose an appropriate coupling bore. Desirably grooves 51 are placed centrally in the outer surfaces of the stiffening ribs 42, 43, 49 and 50.

Hose 40 as above described, provides three sizes of coupling bores or annuli, smallest at 44 and 48 being of substantially equal and smallest diameter C, those at 46 providing the largest coupling bore diameter D, and those at bases 52 providing an intermediate coupling bore diameter F. In a specific example the coupling bores may be as follows:

| Host part: | Diameter |
| --- | --- |
| Coupling sections 41 | 1". |
| Coupling bore C | 7/8" expandable to 1 1/8". |
| Coupling bore D | 1 5/8" expandable to 1 3/4". |
| Coupling bore F | 1 1/4" expandable to 1 3/8". |

For hose of different nominal bore size varying perhaps from 9/16" to 2 inches these three coupling bores C, D and F may be suitably varied.

In another specific example a hose having a nominal bore of 1 1/4" may have coupling bores as follows:

C—1 1/4"
D—2 1/8"
F—1 5/8"

giving an increase of some 70% between the smallest and the largest coupling bores.

In FIG. 6, the hose 40 of FIG. 3 is shown clamped to the different sized conduits 26 and 28 having been cut at the grooves 51 adjacent a corrugation apex 46 and base 44. The worm drive clips 20, in clamping the hose, flatten the slight departures from cylindrical surfaces at 46 and 45. The clamped portions of the corrugations, which have been thickened in the fabrication of the hose, are not so thick as to substantially avoid cylindricality so that the clamps can compress the hose material into cylinders at the clamping areas and provide good, fluid-tight seals.

In FIG. 7 a very short portion of hose 40 is illustrated as having been cut within one intermediate section and clamped to connecting pipes 26 and 29 of different diameter, the connecting pipe 29 being slightly larger than the pipe 28 of FIG. 6. For this reason, the intermediate sized, corrugation base 52 is clamped to pipe 29 instead of the small corrugation base 44 of FIG. 6. FIG. 7 also illustrates the flattening of the base 46 under the worm clamp 20.

Each of the hoses 10, 30 and 40 may be produced in corrugated lengths by sealing a cylindrical tube of raw material (rubber, plastic etc.) within a split mold conforming in shape to the desired outer surface of the hose and blowing the tube into the shape of the mold by air or steam pressure without the use of a core or mandrel. Taking FIGS. 1, 2, 3, in that order FIG. 1 being the simplest form from which FIG. 2 and then FIG. 3 develop; the use of the blowing process without the use of a core or mandrel is explained. In FIG. 1 at 14 the rubber or plastic remains the same thickness or approximately so, as the raw tube used for molding because the tube is supported by the walls of the split former at these areas. At 12 and 16, the wall thickness is slightly reduced due to the stretching of the material to fill the cavities in the former, the radii at 12 and 16 must be of sufficient size to allow for the cavity to fill leaving a concentric radius at these points inside the tube, the substantially even wall thickness is achieved by the gentle angles and radii. At 32 in FIG. 2 the original tube thickness disappears due to the introduction of the small convolution and the material section remains substantially uniform throughout. The small hump (obtuse angle) at 45, FIG. 3, together with the short pitch of the adjacent radii restricts movement of the material and the section is at this point about the same as the original tube but slightly larger in diameter forming a thickened rib. The width at the apices 42, 43, 49 and 50 is less than two wall thicknesses of the rubber or plastic so it is thickened during the blowing operation and a good convoluted shape formed inside the hose. The conical shapes of 43–47–49, 50–52–42 are introduced because it was not possible to introduce thickening at points 47 and 52 during the blowing operation.

When provided with stiffening rib portions the mold is shaped to make use of the natural stretch of the material in the blowing operation to form the thickened ribs, 42, 45, 43, 49 and 50 of hose 40, for example, in the places where they can be most naturally formed by the blowing operation but elsewhere maintain a reasonably uniform wall thickness to attain the desired mechanical strength and flexibility. The external hump at 45, FIG. 3, without internal groove 51, is arrived at by the obtuse angle as compared with radius at 34, FIG. 2. Said angle does not restrict the displacement of rubber in the same way in the blowing operation. When the raw tube is placed in the mold the outside diameter is restricted by radii on either side of the narrow rib portions 45. Rubber will stretch evenly when blown except at points of restriction and the gentle angles and curves of the restricting cavities prevent undue thinning at the points of restriction e.g. if the mold were made with a sharp angle instead of radii on either side of points 45 the rubber would be considerably thinned at these points by the blowing operation. Rubber will stretch in the blowing operation to the shape of the former to which it is blown, and even wall thickness is achieved by gentle radii and angles in proportion to the pitch of the corrugations. When the pressure is applied to bore of tube within the mold, the tube is blown into cavities at 42, 43, 49 and 50, the gentle angles of the corrugations, approximately 27¼ degrees, and the blended radii, about ³⁄₃₂ inch, prevent undue thinning of rubber at the points of restriction, and the obtuse angled configuration at the apices 42, 45, 43, 49 and 50 causes thickening of the rubber mass at these points.

Six standard, three bore hoses such as 40, FIGS. 3, 6 and 7 have been designed to meet the need for a universal replacement radiator hose in Great Britain. The six standards eliminate the necessity for holding stocks of many molded hoses, there being more than 500 various shapes and sizes in current use. Thus, a standard hose for each of six nominal bore sizes is available each having in addition to the nominal bore size of the coupling end sections, the three different bore sizes of intermediate section corrugations, as for example C, D and F of FIG. 3, proportioned to the nominal bore size. With a small stock of the standard hoses it has been found that 95% of the requirements of all the vehicles on the road can be met, it being necessary merely to shorten the proper nominal bore size hose to the length of the hose being replaced and to cut the corrugations at the proper locations to provide coupling bore sizes to fit the particular pipes being connected.

Aside from the great advantage of the universal use of the standard hose as described above, it is further apparent that the provision of stiffening ribs at points such as 42 and 45, 43, 47, 49 and 50 greatly strengthen the hose and serve to maintain the bore open throughout the length of the hose when the latter is installed with its axis bent along a curve. As previously explained, the thickened, stiffening ribs are formed in the mold by the natural stretch of the rubber and by taking advantage of the use of gentle radii and large angles at the locations where the stiffening ribs are to be formed, these preventing undue thinning of the rubber at these locations.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A flexible corrugated hose adapted to be cut to any desired length comprising a length of tubing of elastomeric material having a repetitive series of circumferential corrugations substantially at right angles to the axis of the tubing and extending from near one end to near the other end, each corrugation being internal as well as external and having an apex and a base, and at least some of said bases and some of said apices being axially elongated with respect to others to form annuli of sufficient length for compressive engagement by conventional hose clamping means to achieve fluid-tight sealing, said elongated bases and apices forming substantially cylindrical coupling bores of at least two different internal diameters upon exposure by cutting through the hose transversely to its axis at appropriate points.

2. A flexible corrugated hose adapted to be cut to any desired length, comprising a length of tubing formed of elastomeric material and having a cylindrical coupling section at each end, a plurality of substantially identical and connected intermediate sections between said coupling sections, each intermediate section having repetitive circumferential corrugations substantially at right angles to the axis of the tubing, each corrugation being internal as well as external and having an apex and a base, and at least some of said bases and some of said apices being axially elongated with respect to others to form annuli of sufficient length for engagement by conventional hose clamping means, said hose being capable of being transversely severed at points adjacent said elongated bases and apices to expose substantially cylindrical coupling bores other than those of said end coupling sections and of at least two different diameters.

3. A flexible corrugated hose according to claim 2 wherein each of said axially elongated annuli departs slightly from its cylindrical shape by provision of a reverse corrugation of short depth radially of said tubing, whereby to increase the elasticity and coupling flexibility of the hose and maintain the hose bore in reasonably open state.

4. A corrugated hose according to claim 2 in which the internal diameters of the bases of some of the corrugations differ from those of other corrugations to provide additional coupling annuli of different sizes.

5. A corrugated hose according to claim 2 in which said corrugations are provided with integrally molded, thickened stiffening ribs to maintain the bore of the hose in a reasonably open state when the hose is curved along its axial length.

6. A hose according to claim 2 in which shallow annular grooves are provided at positions where the hose should be cut to expose particular coupling bores.

7. A hose according to claim 6 wherein said shallow grooves are positioned in annular, thickened rib portions.

8. A flexible corrugated hose comprising a length of tubing formed of elastomeric material and having a cylindrical coupling section at each end and a plurality of connected intermediate sections therebetween, each intermediate section having a repetitive series of internal as well as external circumferential corrugations substantially at right angles to the axis of the tubing whose apices and bases provide at least three different internal diameters, said corrugation bases and apices of different diameter being axially elongated for engagement by conventional hose clamping means, said hose being capable of being cut transversely of its axis at points adjacent said elongated bases and apices to expose substantially cylindrical bores other than those of said end sections and of different diameter.

References Cited by the Examiner

UNITED STATES PATENTS 689,688    12/1901    Nodder _____ 138—173 X (Other references on following page)

| | | | |
|---|---|---|---|
| 942,466 | 12/1909 | Schnuerer | 138—173 X |
| 1,783,605 | 12/1930 | Della | 138—177 X |
| 2,025,067 | 12/1935 | Miller | 138—118 X |
| 2,073,335 | 3/1937 | Connell | 138—122 |
| 2,622,623 | 12/1952 | Michaudet | 138—122 |
| 2,656,853 | 10/1953 | Scheele | 138—121 X |
| 2,876,801 | 3/1959 | November | 138—121 |
| 2,995,151 | 8/1961 | Lockwood | 138—121 |
| 3,028,290 | 4/1962 | Roberts et al. | 138—121 X |
| 3,028,291 | 4/1962 | Roberts et al. | 138—121 X |

FOREIGN PATENTS

| | | |
|---|---|---|
| 45,043 | 2/1935 | France. |
| 1,142,735 | 4/1957 | France. |
| 1,198,964 | 6/1959 | France. |
| 4,920 | 3/1895 | Great Britain. |

LAVERNE D. GEIGER, *Primary Examiner.*

LEWIS J. LENNY, *Examiner.*

H. ARTIS, *Assistant Examiner.*